United States Patent
Shimada

(10) Patent No.: US 7,414,735 B2
(45) Date of Patent: Aug. 19, 2008

(54) DISPLACEMENT SENSOR EQUIPPED WITH AUTOMATIC SETTING DEVICE FOR MEASUREMENT REGION

(75) Inventor: Koji Shimada, Fukuchiyama (JP)

(73) Assignee: Omron Corporation, Kyoto-shi (JP)

( * ) Notice: Subject to any disclaimer, the term of this patent is extended or adjusted under 35 U.S.C. 154(b) by 260 days.

(21) Appl. No.: 11/373,508

(22) Filed: Mar. 13, 2006

(65) Prior Publication Data

US 2006/0213280 A1     Sep. 28, 2006

(30) Foreign Application Priority Data

Mar. 15, 2005   (JP)  ............................ P2005-073698

(51) Int. Cl.
*G01B 11/14*     (2006.01)
(52) U.S. Cl. ...................................................... 356/614
(58) Field of Classification Search ......... 356/630–632, 356/614–623, 239.1–239.8; 250/559.38
See application file for complete search history.

(56) References Cited

U.S. PATENT DOCUMENTS 6,724,491 B2 *   4/2004   Matsunaga et al. .......... 356/623

FOREIGN PATENT DOCUMENTS

| JP | 2004-245200 | * | 3/2004 |
| WO | WO 01/57471 A1 | | 8/2001 |

\* cited by examiner

*Primary Examiner*—Hoa Q Pham
(74) *Attorney, Agent, or Firm*—Foley & Lardner LLP

(57) ABSTRACT

A displacement sensor includes: a light projecting element for illuminating a measurement aim object at a predetermined angle with light; a light receiving element for receiving a reflected light from the measurement aim object illuminated with light; an automatic measurement aim region setting device for automatically setting measurement regions for respective acquired two reflecting surfaces by automatically increasing a light emitting quantity of the light projecting element by a predetermined quantity at a time from a predetermined value of the light projecting element till two or more reflecting surfaces of the measurement aim object are acquired on the light receiving element; and a displacement measuring device performing desired measurement of displacement based on a received light image on the light receiving element.

11 Claims, 11 Drawing Sheets

Region 1

Region 2

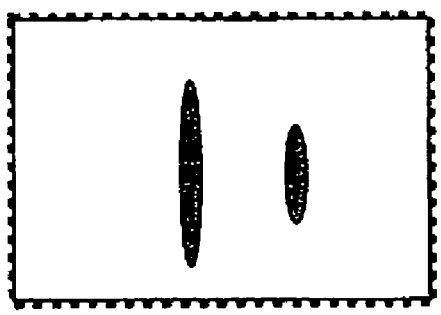
Fig. 11A
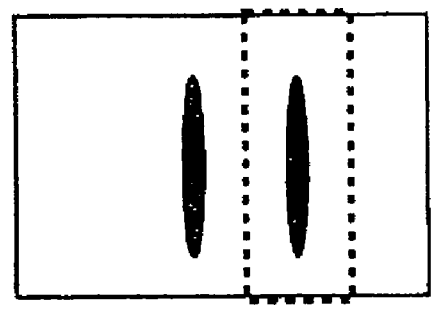
Fig. 11C
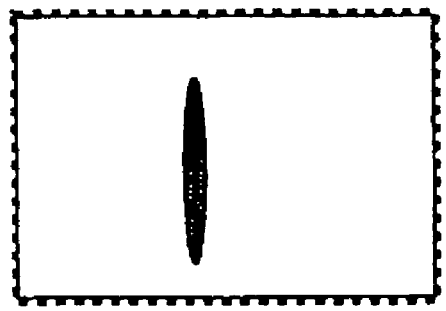
Fig. 11B

DISPLACEMENT SENSOR EQUIPPED WITH AUTOMATIC SETTING DEVICE FOR MEASUREMENT REGION

CROSS-REFERENCE TO RELATED PATENT APPLICATIONS

Japanese Priority Application P2005-73 698, filed Mar. 15, 2005 including the specification, drawings, claims and abstract, is incorporated herein by reference in its entirety.

BACKGROUND OF THE INVENTION

1. Field of the Invention

The invention relates to setting a measurement aim region in a displacement sensor, and in particular, to a setting method for a measurement region having plural areas as aims each different in refractive index from the others, in a case where a transparent object such as glass is as a measurement aim object.

2. Description of the Related Art

In a non-contact displacement sensor (adopting a laser or the like as a light source) using a triangular distance measuring method, a light projecting element illuminates a measurement aim object with light directed thereto and information on which position of a light receiving element light reflected from the measurement aim object is converged to is employed to thereby measure a distance to the measurement aim object.

In a case where a transparent object such as glass is measured as a measurement aim with such a displacement sensor, however, two kinds of reflected light which are generated from a front surface and back surface of the glass are usually generated. Such a glass often has a back surface with a film such as a metal coat or the like even though a front surface has no coverage, and in a case where such a glass with a film is measured, a difference in reflected light quantity occurs between the front and back surfaces due to difference in refractive index. Examples thereof are a glass plate used as a Brown tube of a television receiver, a glass plate of a liquid crystal panel or the like. In such a case, if an emitted light quantity of the light projecting element and a light receiving sensitivity such as a light receiving gain of the light receiving element are adjusted in order to be adapted for one surface, a light receiving state on the other surface cannot be held to be proper (a received light quantity is excessively large or small), which makes positions of the front and back surfaces hard to be correctly acquired.

Besides, in a case where a glass measurement is conducted, there are incoming light by reflection from the front and back surfaces or a multiple reflection. In such a situation, a necessity arises for individual surfaces to be separately recognized with respect to light receiving positions in order to stably measure a surface displacement of the glass or a thickness of the glass. As a measure therefor, an area in the vicinity of a light receiving position which is desired to be measured is set as a measurement aim region, thereby enabling the set measurement aim region to be stably measured.

In a case where, as shown in FIG. 11A, in setting of a predetermined laser light emitting quantity and a light receiving sensitivity, a glass plate is measured as a measurement aim object, reflected light quantities from the front surface and back surface of a glass are clearly different from each other with respect to an image obtained from the receiving light element, leading to a chance of disabling either of both quantities to be measured. In setting of a predetermined laser light emitting quantity and a predetermined light receiving sensitivity, as shown in FIG. 11B, there often occurs a case where a received light image of only one of the front surface and back surface is obtained due to an excessively large difference in reflectance between the front and back surfaces of the glass. In such a case, if a laser light emitting quantity is increased or a light receiving sensitivity of the entire pixel region of a light receiving element is enhanced, so that stable measurement is secured for one surface from which a smaller received light quantity is given, saturation occurs for the other reflecting surface, having produced a problem that stable measurement is disabled.

In order to cope with such a situation, for example, a measurement region is, as shown in FIG. 11C, limited to a region enclosed by dotted lines, and a laser light emitting quantity or a light receiving gain is adjusted only for the region to thereby enable light from a surface on which measurement is desired to be stably received without exerting an adverse influence on the other surface.

A displacement sensor has been known that enables plural regions having respective arbitrary sizes to be discretely set in the entire pixel region of an image pick-up element (refer to, for example, WO 2001/057471).

In a case where a received light quantity from a surface with a smaller reflectance cannot be, as shown in FIG. 11(b), observed on a screen image obtained from a light receiving element because of a setting state of a light receiving sensitivity at that time, there is a high possibility that a sensitivity matching a surface from which a larger received light quantity given is set while not taking notice of the presence of the surface with a smaller reflectance. Though it is desirable to detect all the reflecting surfaces and to set the measurement aim regions on the respective surfaces, it can be said to be difficult to take notice of even a necessity for such an operation. In a case where reflecting surfaces are remote from each other and an image on one reflecting surface resides outside the measurable range of displacement measurement on a light receiving element, the image is not on the light receiving element; therefore, the reflecting surface cannot be found despite of all the effort of searching therefor and a measurement aim region cannot be set thereon. In such a case, operator in charge has a chance to regard it due to unskilled setting of a sensitivity despite the fact that the problem is caused by a distance between a glass, which is a detection aim, and a displacement sensor to repeat a try-and-error approach and to thereby increase time and labor to be consumed thereon. Since, in such a way, an image of a surface with a low reflectance has a possibility of the presence, even if the image is not observed and a case arises where a surface, which is low in reflectance as a measurement aim, cannot appear on an image of a light receiving element because of being outside the range of displacement measurement, an operation of setting a measurement region is of difficult determination having to give a consideration to a range of a displacement sensor, a spacing between reflecting surfaces of a measurement aim object and an installment spacing between the displacement sensor and a reflecting surface in addition to a necessity therefor, which is hard to take the operation to be performed by the operator at a job site with ease.

A problem has been pointed out that a user is necessary to be participated in such an operation, which loses an operational efficiency.

In a case where, in such a way, an approximate position of a measurement aim region is visually recognized by a user with a received light waveform displayed on a monitor or the like and thereafter a measurement region is set by manual input, a measurement region can be set in the situation shown in FIG. 11A, grasping with some accuracy which position a second reflecting surface is present at, while since it is not known where a second reflecting surface is present in a situation shown in FIG. 11B, a complicated operation is requested, in order to recognize the position, that a laser light emitting quantity of a light projecting element and a light receiving sensitivity of a light receiving element are adjusted in advance of setting of a measurement region, which have pointed a problem of a great reduction in operational efficiency.

SUMMARY OF THE INVENTION

The invention has been made focusing attention to such conventional problems and it is an object of the invention to provide a displacement sensor capable of automatically setting a measurement aim region to thereby realize stable measurement even in a case where a measurement aim object having plural surfaces each different in reflectance from the others like a transparent object such as glass is an aim.

It is another object of the invention to provide a displacement sensor capable of automatically setting a measurement aim region to thereby improve an operational efficiency greatly without interposing a manual operation by a user even in a case where a treatment such as formation of a metal film is applied to a transparent object such as glass and thereby, reflectance of the front and back surfaces thereof are conspicuously different from each other.

Other objects and actions and effects of the invention will be easily understood by a person skilled in the art with reference to the following description of the specification.

A displacement sensor of the invention includes: a light projecting element for illuminating a measurement aim object at a predetermined angle with light; a light receiving element for receiving a reflected light from the measurement aim object illuminated with light; an automatic measurement aim region setting device for automatically increasing amount of an emitting light of the light projecting element by a predetermined quantity or a predetermined ratio at a time from a predetermined value of the light projecting element till two or more reflecting surfaces of the measurement aim object are acquired on the light receiving element, and automatically setting measurement regions for respective at least two reflecting surfaces acquired; and a displacement measuring device performing desired measurement of displacement based on a received light image on the light receiving element corresponding to the set measurement aim region.

With such a construction, even in a case where a measurement aim object different in reflectance between the front and back surfaces thereof like a glass plate is measured, a reflecting surface of a surface, which is a measurement aim, can be acquired with certainty, thereby enabling a measurement aim region to be automatically set.

According to an embodiment of the invention, the automatic measurement aim region setting device continuously increases the amount of an emitting light of the light projecting element till three or more reflecting surfaces of a measurement aim object on the light receiving element are acquired.

With such a construction, for example, even in a case where measurement is of a gap between a surface of a work on the other side of glass and the glass, three surfaces including the front surface of the glass, the back surface of the glass and the surface of the work on the other side are acquired with certainty, thereby enabling correct measurement to be performed.

According to an embodiment of the invention, the automatic measurement aim region setting device acquires a reflecting surface based on a maximum value of a receiving light quantity distribution on the received light image and measurement aim regions on respective reflecting surfaces each are set so as not to overlap on waveforms of receiving light quantity distributions corresponding to other reflecting surfaces.

To set each measurement region so as not to overlap on waveforms of received light quantity distributions corresponding to the other reflecting surfaces is a case where the whole of waveforms of receiving light quantity distributions received from the other reflecting surfaces is not included, a case where a portion equal to or exceeding a predetermined value is not included, and a case where a portion in which a receiving light quantity is larger than a value based on a maximum value corresponding to a reflecting surface of interest is not included. Thereby, reflecting surfaces corresponding to respective measurement aim regions can be obtained with certainty.

The term "measurement aim" includes: a glass front surface, a glass back surface, a glass thickness, a work surface on the other side of glass, a gap between a work surface on the other side of glass and the glass and the like.

According to the invention, the light receiving element may be an either two-dimensional or one-dimensional image pick-up element. With such a construction adopted, an automatic setting processing for a measurement aim region of the invention is enabled either in a case where a two-dimensional image pick-up element is applied as a light receiving element or in a case where a one-dimensional image pick-up element is applied as a light receiving element to thereby enable an automatic setting processing for a measurement region with general versatility.

According to another embodiment of the invention, a displacement sensor includes: a light projecting element for illuminating a measurement aim object at a predetermined angle with light; a light receiving element for receiving a reflected light from the measurement aim object illuminated with light; an automatic measurement aim region setting device for automatically increasing a light receiving gain of the light receiving element by a predetermined quantity or a predetermined ratio at a time from a predetermined value thereof till two or more reflecting surfaces of a measuring aim object are acquired on the light receiving element, and automatically setting measurement regions for respective at least two reflecting surfaces acquired; and a displacement measuring device performing desired measurement of displacement based on a received light image of the receiving light element corresponding to the set measurement aim region.

With such a construction, even in a case where a measurement aim object different in reflectance between the front and back surfaces thereof like a glass plate is measured, a reflecting surface of a surface, which is a measurement aim, can be acquired with certainty, thereby enabling a measurement aim region to be automatically set. Such an automatic setting processing for a measurement aim region is enabled by changing a light receiving sensitivity through adjusting a light receiving gain on the light receiving element side.

According to an embodiment of the invention, the automatic measurement aim region setting device continuously increases the light receiving gain of the light receiving element till three or more reflecting surfaces of a measurement aim object on the light receiving element are acquired.

With such a construction, for example, even in a case where measurement is performed of a gap between a surface of a work on the other side of glass and the glass, three surfaces including the front surface of the glass, the back surface of the glass and the surface of the work on the other side are acquired with certainty, thereby enabling correct measurement to be performed.

According to an embodiment of the invention, the automatic measurement aim region setting device acquires a reflecting surface based on a maximum value of a receiving light quantity distribution on a received light image, and sets the measurement aim regions on respective reflecting surfaces so as not to overlap on waveforms of receiving light quantity distributions corresponding to other reflecting surfaces.

To set each measurement aim region so as not to overlap on waveforms of received light quantity distributions corresponding to the other reflecting surfaces includes a case where the whole of waveforms of receiving light quantity distributions received from the other reflecting surfaces is not included, a case where a portion equal to or exceeding a predetermined value is not included, and a case where a portion in which a receiving light quantity is larger than a value based on a maximum value corresponding to the reflecting surface of interest. Thereby, reflecting surfaces corresponding to respective measurement aim regions can be obtained with certainty.

According to the invention, the light receiving element may be an either two-dimensional or one-dimensional image pick-up element. With such a construction adopted, an automatic setting processing for a measurement aim region of the invention is enabled either in a case where a two-dimensional image pick-up element is applied or in a case where a one-dimensional image pick-up element is applied to thereby enable an automatic setting processing for a measurement region with general versatility to be provided.

According to another embodiment of the invention, a displacement sensor includes: a light projecting element for illuminating a measurement aim object at a predetermined angle with light; a light receiving element for receiving a reflected light from the measurement aim object illuminated with light; an automatic measurement aim region setting device for automatically increasing amount of an emitting light of the light projecting element and a light receiving gain of the light receiving element, both simultaneously, by a predetermined quantity or a predetermined ratio at a time from a predetermined value thereof till two or more reflecting surfaces of the measurement aim object are acquired on the light receiving element, and automatically setting measurement regions for respective at least two reflecting surfaces acquired; and a displacement measuring device performing desired measurement of displacement based on a received light image on the receiving light element corresponding to the set measurement aim region.

With such a construction, even in a case where a measurement aim object different in reflectance between the front and back surfaces thereof like a glass plate, a reflecting surface of a surface, which is a measurement aim, can be acquired with certainty, thereby enabling a measurement region to be automatically set. Such an automatic setting processing for a measurement aim region can be performed by adjustment in which a light emitting quantity on the light projecting side and a light receiving gain on the light receiving element side are simultaneously increased gradually.

According to an embodiment of the invention, increase in a light emitting quantity of the light projecting element and light receiving gain of the light receiving element is continued till three or more reflecting surfaces of a measurement aim object on the light receiving element is acquired in the automatic measurement region setting device.

With such a construction, for example, even in a case where measurement is of a gap between a surface of a work on the other side of glass and the glass, three surfaces including the front surface of the glass, the back surface of the glass and the surface of the work on the other side are acquired with certainty, thereby enabling correct measurement to be performed.

According to the embodiments, an automatic setting processing for the measurement aim region can be performed based on a measurement aim designated in advance by a user.

With such a construction, easy adaptation can be ensured for a case where a measurement aim region setting processing is different for a different measurement aim and intervention of a user is reduced to the minimum level to thereby negate an adverse influence on an operational efficiency.

According to the invention, the light receiving element may be an either two-dimensional or one-dimensional image pick-up element. With such a construction adopted, an automatic setting processing for a measurement aim region of the invention is enabled either in a case where a two-dimensional image pick-up element is applied as a light receiving element or in a case where a one-dimensional image pick-up element is applied to thereby enable an automatic setting processing for a measurement region to be provided with general versatility.

According to the invention, as is clear in the above description, even in a case where a measurement aim object having plural surfaces each different in reflectance from the others, a measurement aim region can be automatically set to thereby exert an advantage of greatly improving an operational efficiency in measurement while stable measurement is realized.

BRIEF DESCRIPTION OF THE DRAWINGS

FIGS. 11A to 11C shows diagrams describing of a case where glass front and back surfaces are different in reflectance from each other.

DETAILED DESCRIPTION OF THE PREFERRED EMBODIMENT

With reference to the accompanying drawings, detailed description will be given of a preferred embodiment of the invention below. Note, by way of precaution, that the spirit and scope of the invention is specified only by appended claims and the following embodiment shows only one example of the invention.

Figure 1:
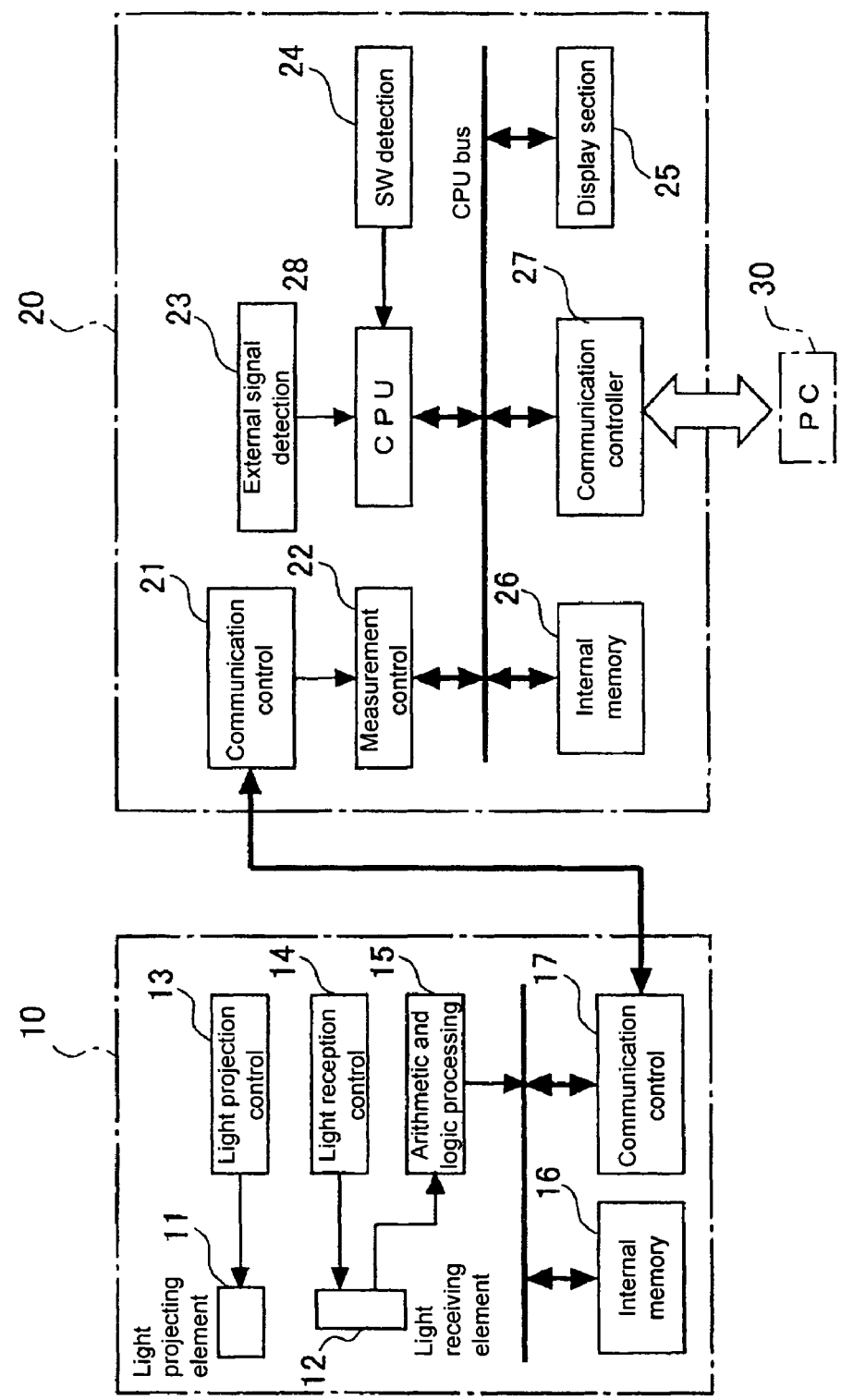
FIG. 1 shows a block diagram of an electrical hardware construction of a displacement sensor pertaining to the invention.

In FIG. 1, there is shown a block diagram of an electrical hardware construction of a displacement sensor of the embodiment. The displacement sensor in the embodiment is a so-called amplifier separation type in which a sensor head section 10 and a signal processing section 20 are separated and is connected to a PC 30, which is external control equipment, in order to enable the sensor to be accommodated compactly within a control panel, or in order to render installment enabled in a narrow instrumentation environment.

The sensor head section 10 includes: a light projecting element 11; a light receiving element 12; a light projection control section 13; a light reception control section 14; a arithmetic and logic section 15; an internal memory 16 and a communication control section 17.

The light projecting element 11 constituted of, for example, LD (a laser diode). The light projection control section 13 generates a driving pulse for the light projecting element 11 to cause the light projecting element 11 to launch pulsed light toward a measurement aim object for illumination. The light reception control section 14 controls the light receiving element 12. Note that an image pick-up element on which an intensity distribution of received light quantities can be measured, such as a one-dimension image pick-up element or a two-dimensional image pick-up element can be used as the light receiving element 12 stated herein. Examples of the image pick-up element include: a CCD, a CMOS, a photo diode display and the like.

The arithmetic and logic section 15 acquires a receiving light quantity obtained from the light receiving element 12 to calculate a feature quantity. The internal memory 16 stores information specific to the sensor, such as a measurement cycle for a measurement aim object, an ID number (identification number) of the sensor head section 10 and the like. The communication control section 17 controls communication with the signal processing section 20.

The sensor head section 10 of the embodiment is of the circuit construction as described above and in this example, a light projection processing is performed in response to a command of the signal processing section 20 and used to perform a processing for sending a light reception signal obtained by a received light processing to the signal processing section 20 at a proper timing.

The signal processing section 20 includes: a communication control section 21; a measurement control section 22; an external signal detecting section 23; an SW detecting section 24; a display section 25; an internal memory 26; a communication controller 27; and CPU 28.

The communication control section 21 performs control of communication with the sensor head section 10 to acquire receiving light data from the sensor head section 10. The measurement control section 22 performs a measurement processing such as measurement of a distance to a measurement aim object based on data acquired from the sensor head section 10. The external signal detecting section 23 detects an external signal such as an external trigger to input a timing, at which a measurement result by the measurement control section 22 is obtained, into CPU 28.

The SW detecting section 24 detects an input from a switch or a button, not shown, attached to the signal processing section 20. The display section 25 includes: a liquid crystal display section displaying a measured value and setting conditions; an indicating lamp LED indicating operating conditions and the like. The internal memory 26 stores calculation results, such as a measured value. The communication controller 27 controls USB and RS-23 for performing communication with an external PC 30 or the like.

CPU 28 generally controls the whole of the signal processing section 20. CPU 28 reflects setting of measurement conditions based on a switch state acquired from the SW detecting section 24 and displays the results on the display section 25. CPU has a function of a measured value acquiring section to display a measured value obtained from the measurement control section 22 and setting of measurement conditions on the display section 25. CPU 28 has a function of a measurement timing acquiring section to detect a timing for generating time information, to calculate the time information and to add the calculated time information to a measured value. CPU 28 stores the measured value into the internal memory 26, or alternatively, has a function of acquiring the measured value and further has a function of transferring the acquired measured value to a communication controller.

Figure 2:
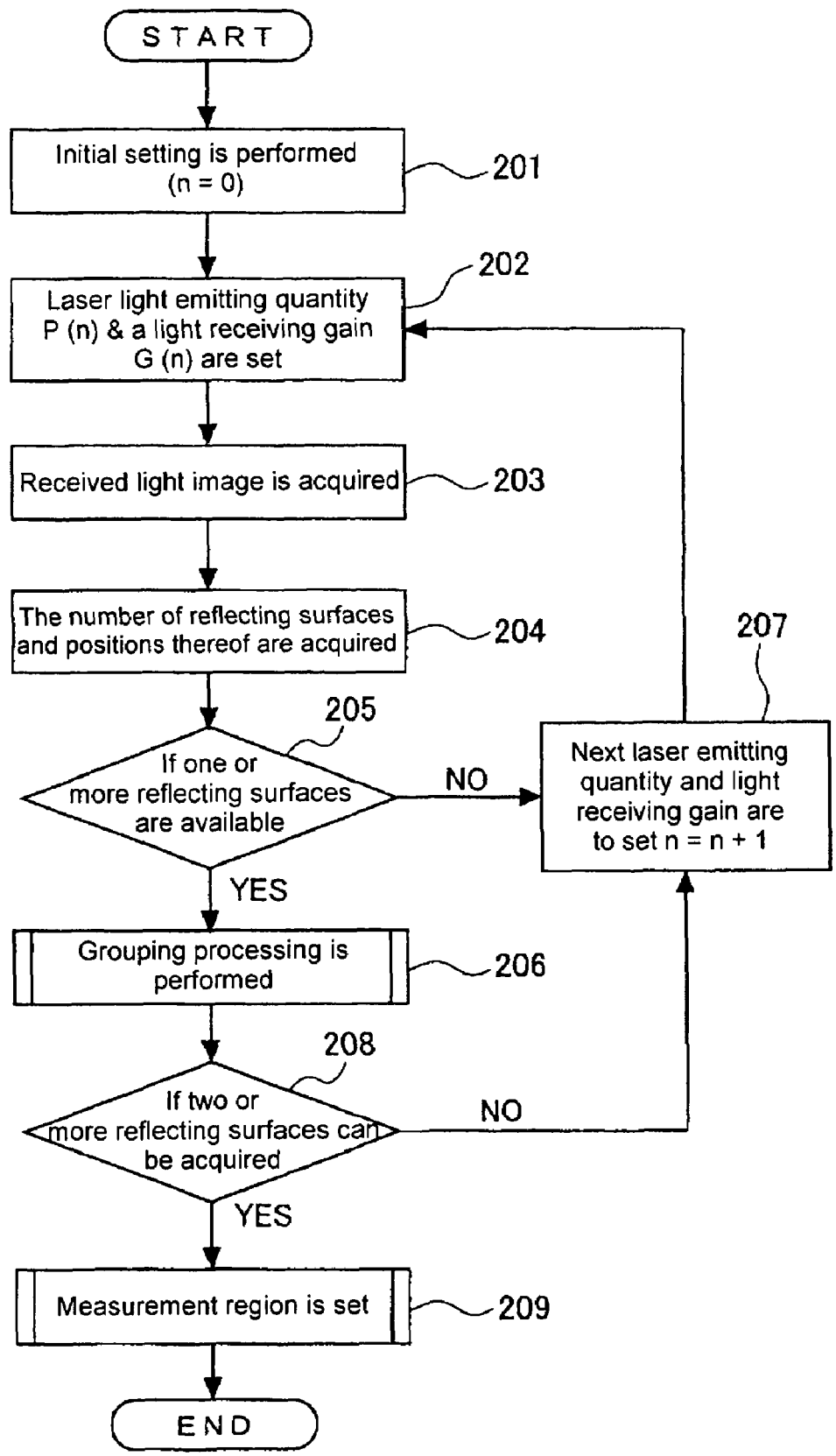
FIG. 2 shows a flowchart of operation in a signal processing section.
Figure 3:
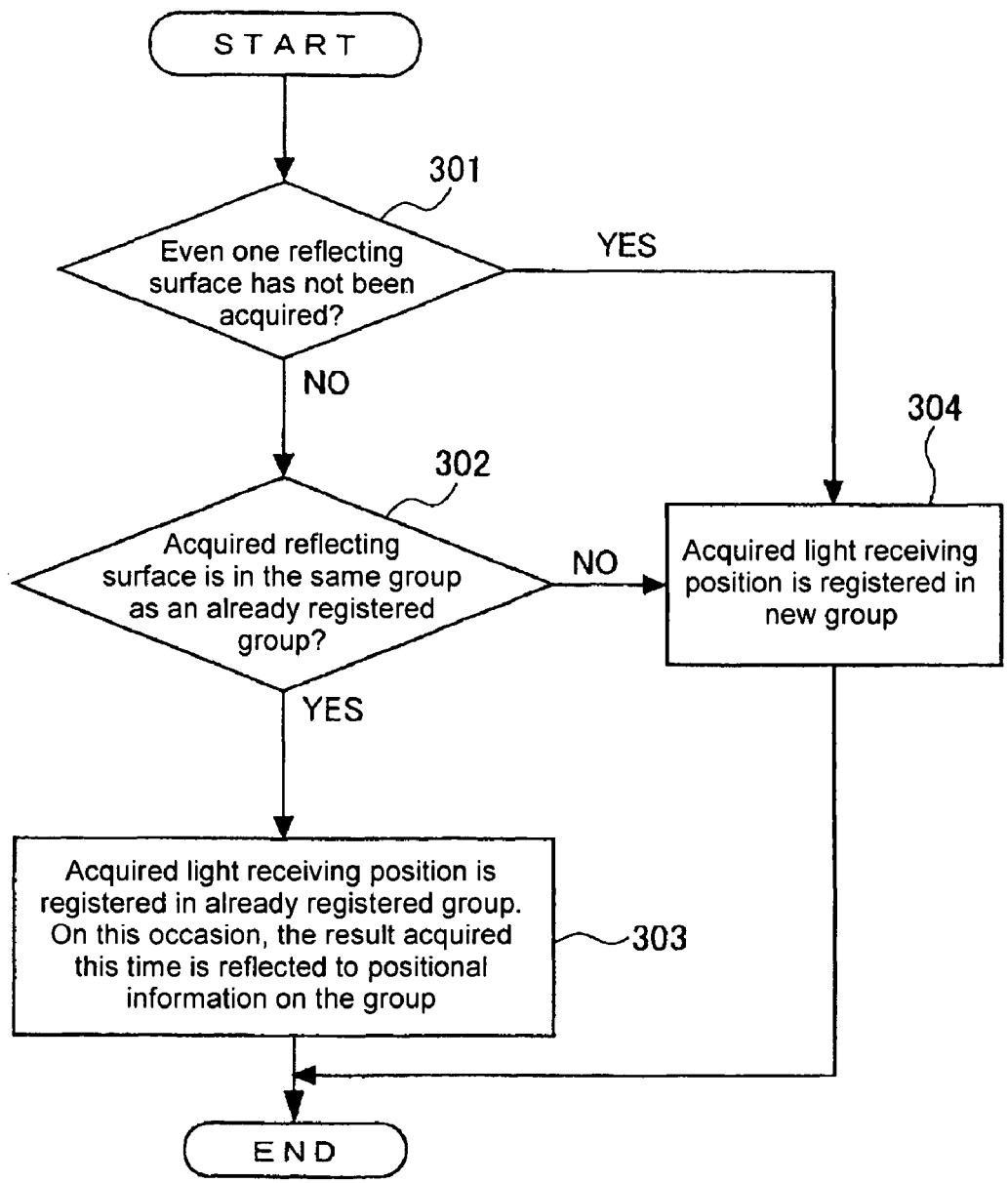
FIG. 3 shows a flowchart of details of a grouping processing.
Figure 4:
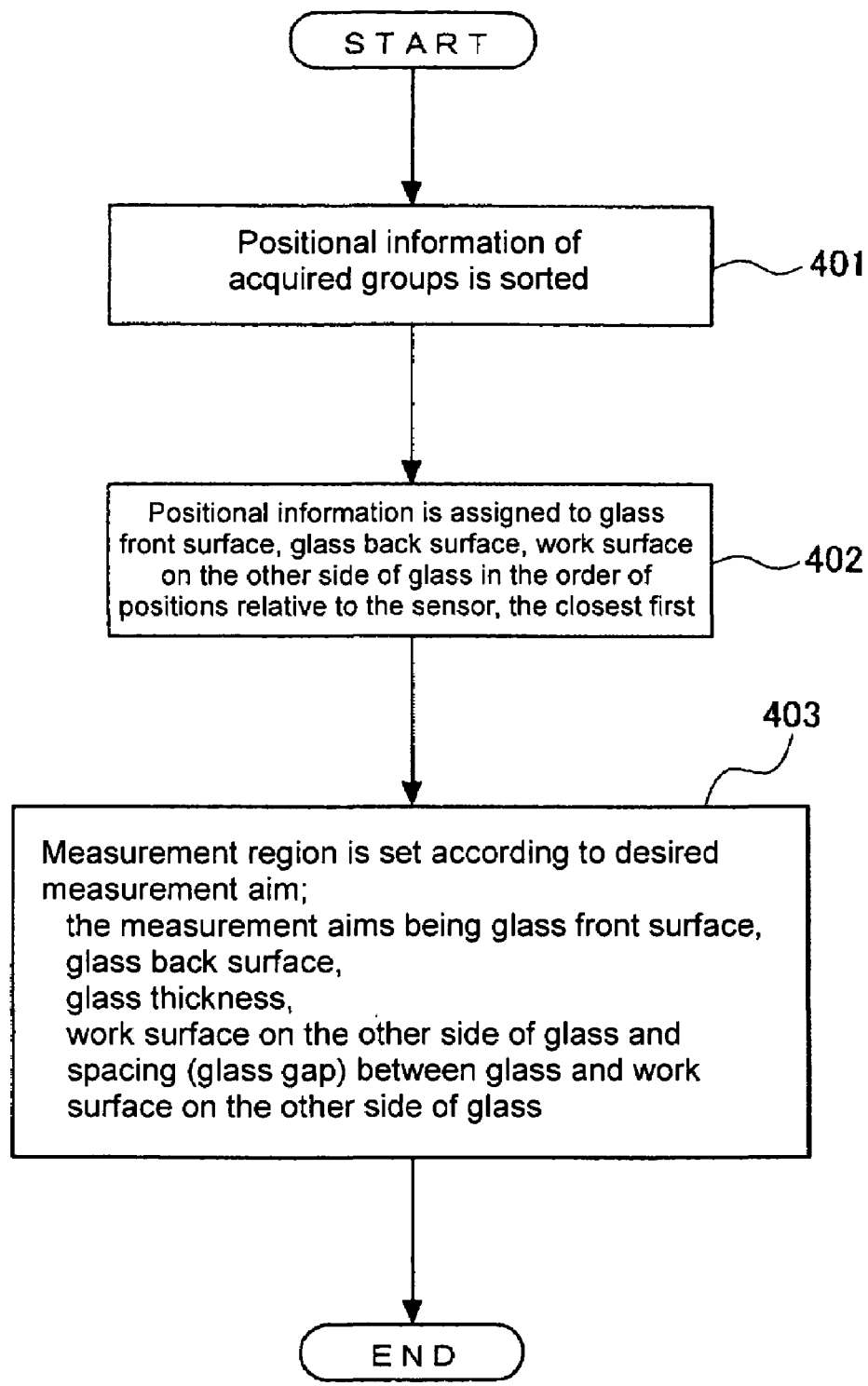
FIG. 4 shows a flowchart of details of setting of a measurement region.

In FIG. 2, there is shown a flowchart showing operation in the signal processing section 2, in FIG. 3, there is shown a flowchart showing details of a grouping processing and in FIG. 4, there is shown a flowchart showing details of a measurement region setting process.

As shown in FIG. 2, a processing gets started at power-on, then a initial setting (n=0) performed (step 201). Thereafter, performed are setting of a laser light emitting quantity P (n) of the light projecting element and a light receiving gain G (n) of the light receiving element. (step 202). In this step, a laser light emitting quantity is set to 0 or the minimum value and a light receiving gain is set to 0 or the minimum gain so as to assume the first value on the smaller side of a received light quantity in a case where the received light quantity is stepwise altered. Then, light is projected to a measurement aim object from the light projecting element based on a laser light emitting quantity set in step 202 and a received light image is acquired based on a light receiving gain set at the light receiving element (step 203). The number of reflecting surfaces and positions thereof are acquired based on the obtained received light image (step 204). A reflecting surface is obtained by means of a method selecting a maximum value equal to or more than a predetermined threshold value among a received light distribution obtained from the received image, or a method in conformity therewith. At this time, if no reflecting surface is available (step 205, NO), the next laser light emitting quantity or/and a light receiving gain are set to n=n+1 so that a light received quantity of a received light image increases by a predetermined quantity or a predetermined ratio (step 207) and then the process returns to step 202, a received light image, and the number of reflecting surfaces and positions thereof are again acquired. Then, the process returns to step 205, and if one or more reflecting surfaces are available (step 205, YES), a grouping processing, which is detailed later, is performed (step 206). By performing the grouping processing, it is confirmed whether or not two or more reflecting surfaces can be acquired (step 208). At this time, in a case where a measurement aim object is a work on the other hand of glass or a glass gap, control is automatically continued till three or more reflecting surfaces are acquired. If two or less reflection surface is available (step 208, NO), a laser light emitting quantity and a light receiving gain are again set in step 207 and the steps are repeated. If two or more reflecting surfaces can be acquired, an automatic setting processing for a measurement region, which will be detailed later, is performed (step 209).

In FIG. 3, there is shown details of a grouping processing in FIG. 2. In the grouping processing, first of all, it is confirmed whether or not even one reflecting surface has not been acquired (step 301). If even one has, at this time, not been acquired (step 301, YES), an acquired light receiving position is registered as a new group. If a reflection surface has, on the other hand, been acquired (step 301, NO), it is confirmed whether or not an acquired reflecting surface is in the same group as an already registered group (step 302). Herein, in a case where the following condition is satisfied, the acquired reflecting surface is determined to be in the same group.

$$|X(n)-x| \leq T(k, l, b, p),$$

wherein x is an acquired light receiving position, X(n) is an average light receiving position of an already registered group, T (k, l, b, p) is a threshold value at which optical separation of received light waveforms is disabled which is caused mainly by the following parameters:

k is a cross angle, l is a beam shape, b is a magnification, and p is the number of light receiving pixels.

If the acquired reflecting surface is in the same group as an already registered group based on the conditions (step 302, YES), the acquired image is registered in the already registered group (step 303). On this occasion, the result acquired this time is reflected to positional information on the group. A result obtained by averaging the positional information on the same group is adopted as positional information on the group. If it is determined that the acquired image is not in the same group as an already registered group (step 302, NO), the acquired light receiving position is registered as a new group.

In FIG. 4, there is shown details of a setting processing for a measurement region shown in FIG. 2. First of all, positional information on acquired groups is sorted (step 401). Then, the positional information is assigned to a glass front surface, a glass back surface, a work surface on the other side of glass in the order of positions relative to the sensor, the closest first (step 402). Thereafter, automatic setting of a measurement region is performed for a desired measurement aim (step 403). Herein, the measurement aims include: various kinds of measurement aims, such as a glass front surface, a glass back surface, a glass thickness, a work surface on the other side of glass and a spacing (glass gap) between the glass and the work surface on the other side of the glass.

A different processing is required according to a measurement aim in setting a measurement aim region. In a case where a glass front surface, a glass back surface and a thickness of glass are measurement aims, measurement can be performed by acquiring two reflecting surfaces (the glass front surface and the glass back surface). In a case where a measurement aim is a glass gap (a spacing between the glass and the work surface on the other side of the glass), measurement is not completed only with the two surfaces and three surfaces is necessary to be acquired (a glass front surface, a glass back surface and a work surface on the other side of glass). Therefore, a measurement region setting process is different according to a measurement aim.

Detailed description will be given of an automatic measurement region setting processing in a case where a measurement aim is a glass thickness (two reflecting surfaces are acquired) below.

Figure 5:
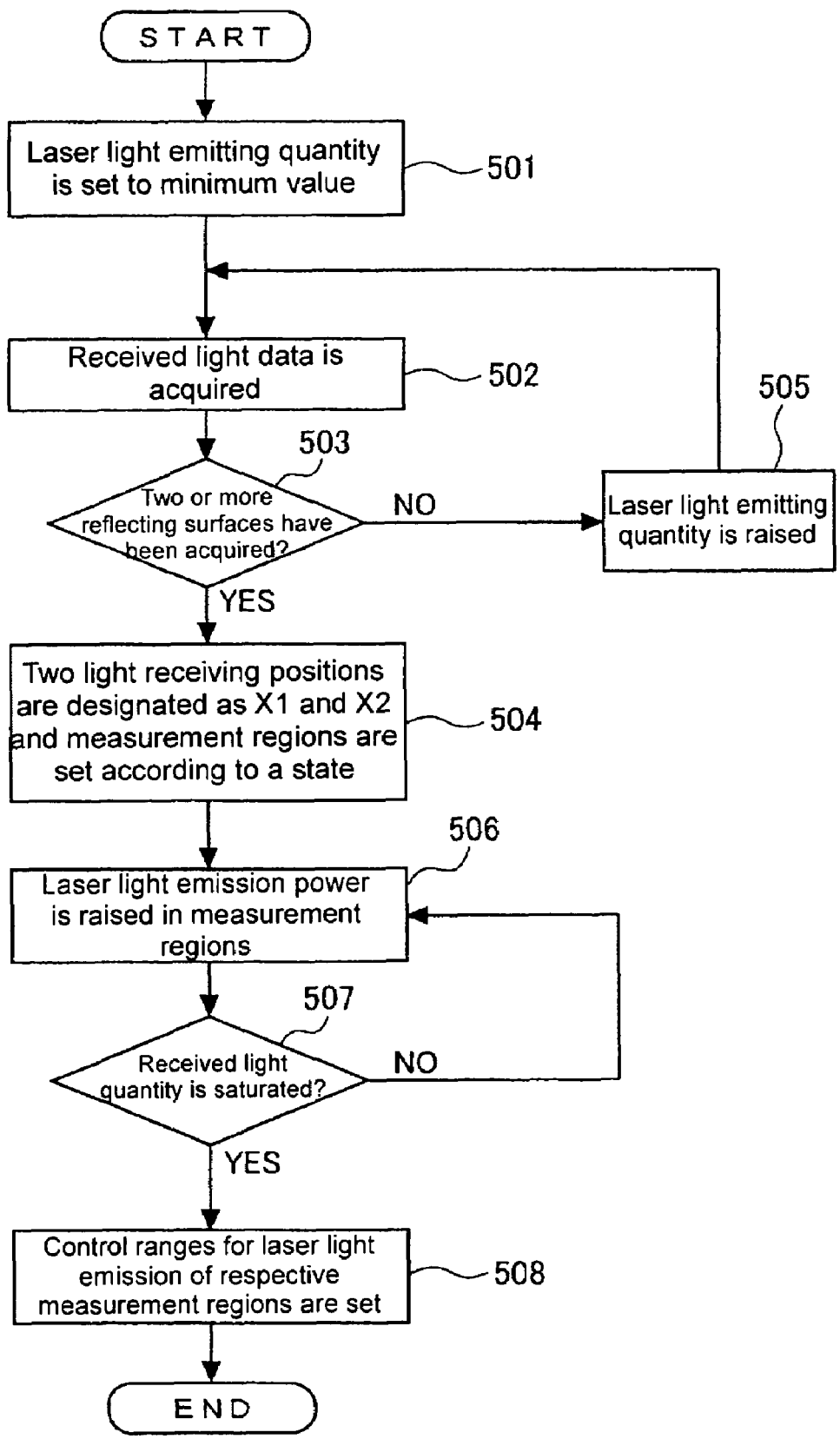
FIG. 5 shows a flowchart of a measurement region setting processing in a case where a measurement aim is a glass thickness.

In FIG. 5, there is shown a flowchart of an automatic measurement region setting processing in a case where a measurement aim is a glass thickness. First of all, a laser light emitting quantity is set to the minimum value (step 501), received light data is acquired at the set laser light emitting quantity (step 502). Then, it is confirmed whether or not two or more light receiving surfaces have been able to be acquired (step 503). If two reflecting surfaces has not been acquired, (step 503, NO), a laser light emitting quantity is raised (step 505), the process returns to step 52 to acquire received light data again. The adjustment for a laser light emitting quantity is continued till two or more reflecting surfaces are acquired on the light receiving element and if two or more reflecting surfaces have been acquired at a raised receiving light quantity (step 503, YES), two light receiving positions are designated as X1 and X2 and automatic setting of measurement regions is performed according to a state described later (step 504). After setting measurement regions is completed, a laser light projection power is raised in respective measurement regions (step 506). In this step, a laser light projection power is raised till a received light quantity in a measurement region is saturated (step 507, NO). If a received light quantity is saturated (step 507, YES), control ranges of the respective measurement regions are set (step 508). In setting of a control range of a measurement region, the upper limit value in the laser control range is set. A laser light emitting quantity about 1.4 times as large as that when a reflecting surface can acquired is set as the upper limit and thereby optimization of light projection can be performed.

In such a way, by automatically controlling a laser light emitting quantity of a light projecting element till a necessary number of measurement aim surfaces can be acquired, a received light image on a desired measurement aim surface can be easily acquired without intervention of a user. In the course of gradual adjustment of a laser light emitting quantity, it is possible to grasp the optimal laser light emitting quantity in a measurement aim region and at a stage of transition from a subsequent setting of a measurement region to actual measurement, the region setting and measurement can be performed with ease and good efficiency since the optimal laser light emitting quantity has been already grasped for actual measurement.

Increase in laser light emitting quantity in step 205 is implemented by a equal magnification (for example, ×1.1) at a time. By increasing a laser light emitting quantity gradually in this way, noise from external disturbance light or multiple reflection can be discriminated from reflection on an actual measurement surface with ease, thereby enabling reduction in measurement precision to be caused by such noise to be prevented.

Note that in the example, a reflection surface, which is a necessary measurement aim surface, is acquired by adjusting a laser light emitting quantity, while a similar effect can be obtained by adjusting a light receiving sensitivity (gain) on the laser receiving side. Adjustment may be simultaneously applied to a laser light emitting quantity on the light projecting element side and a light receiving sensitivity on the light receiving element side.

With reference to FIGS. 6 to 8, detailed description will be given of a region teaching function associated with automatic setting of a measurement region for a different measurement aim. FIGS. 6A to 6E show diagrams describing setting of measurement regions in a case where a glass front surface is measured, FIGS. 7A to 7E show diagrams describing setting of measurement regions in a case where a glass back surface is measured and FIGS. 8A to 8D shows diagrams describing setting of measurement regions in a case where two regions are measured. In the figures, light reflected from a measurement aim surface and then received light is displayed as line bright waveforms. In the figures, the ordinates are assigned to a received light quantity, while the abscissas are used for plotting a light receiving position. In this case, the left side on an abscissa indicates a position closer to the sensor head section 10 and the more right side thereon indicates a position farther therefrom. In each of FIGS. 6 and 7, there is shown a line bright waveform in a state where a measurement region has not been set on the left side, while, on the right side, there is shown a line bright waveform in a state where a measurement region has been set. A measurement aim region is shown by a region enclosed with dotted lines in an image on the right side and a triangular line bright waveform, all in black color, showing a received light quantity is of the reflecting surface of a measurement aim. In FIG. 8, a triangular line bright waveform shown at the left end is one on which no measurement region has been set, a measurement aim region 1 is one shown in the middle and a measurement aim region 2 is one shown at the right end.

FIGS. 6A to 6E show setting of measurement regions in a case where a glass front surface is measured. Hence, in a figure showing a state after setting of a measurement region on the right side, a received light waveform on the left side (glass front surface) is provided as a measurement aim.

Figure 6A:
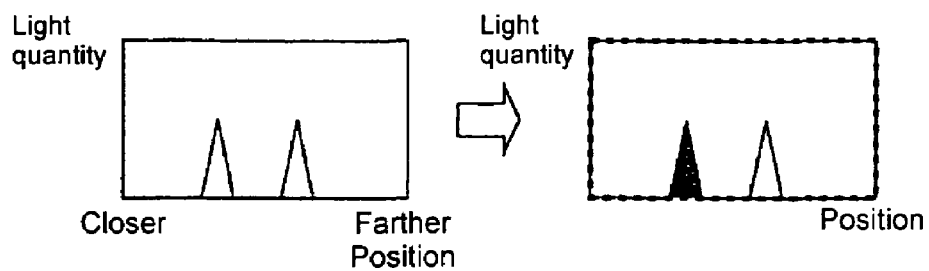
FIGS. 6A to 6E show diagrams describing setting of measurement regions in a case where a glass front surface is measured.

In FIG. 6A, there is shown a case where a difference in light quantity between acquired two reflecting surfaces is small. In a case where a difference in light quantity between two reflecting surfaces is small, a region covers all the area and the measurement aim region is set as a first light receiving position (glass front surface). In such a way, no necessity arises for dividing a region into two sub-regions in a case where a difference in light quantity between two reflecting surfaces is small.

Figure 6B:
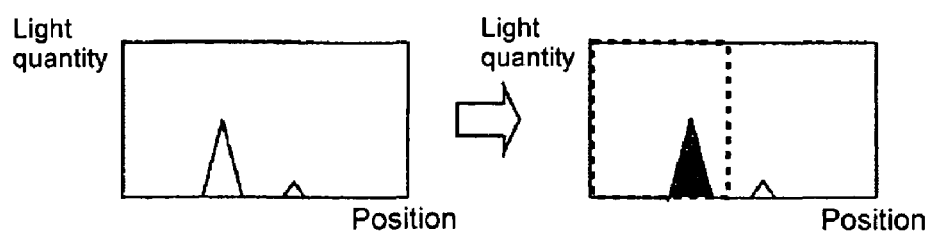
Figure 6C:
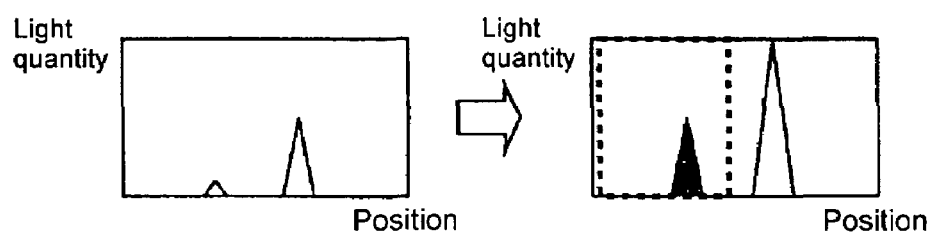

In FIGS. 6B and 6C, there are shown cases where a difference in light quantity between two reflecting surfaces is not neglected. FIG. 6B shows a case where a received light quantity at a first light receiving position (glass front surface) is larger than a received light quantity at a second light receiving position (glass back surface), while FIG. 6C shows a case where a received light quantity of the glass back surface is larger than that of the glass front surface. In a case where a difference in received light quantity occurs, a region is set with a center between first and second measurement aim surfaces as a boundary. Since a measurement aim is in this case a glass front surface, a region including a first light receiving position is designated as a measurement aim region with a center between first and second measurement aim surfaces as a boundary.

Figure 6D:
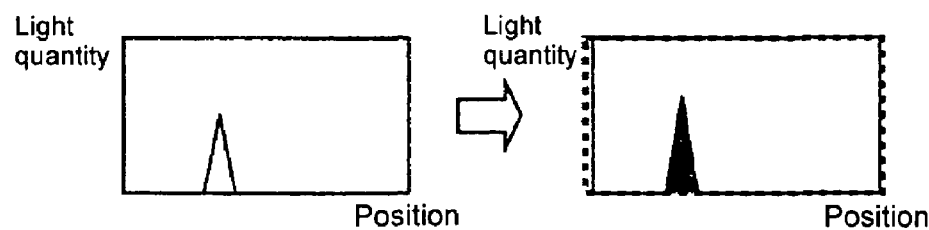
Figure 6E:
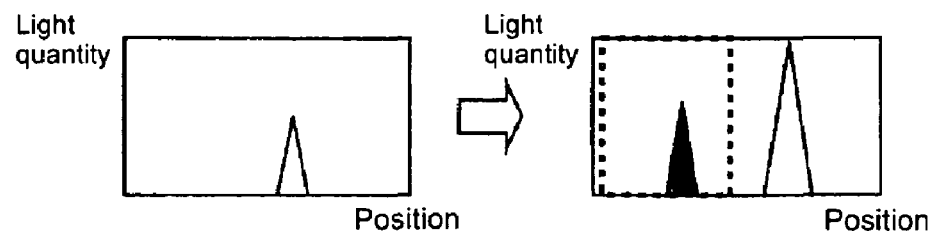

In FIGS. 6D and 6E, there are shown cases where a difference in light quantity between two surfaces is very large, and in FIG. 6D, there is shown a case where, though a received light waveform on a glass front surface is acquired, a received light quantity on a glass back surface is greatly smaller than that on a glass front surface; therefore, a received light waveform of the glass back surface is not acquired. Contrast thereto, in FIG. 6E, there is shown a case where, though a received light waveform of a glass back surface is acquired, a received light quantity on a glass front surface is greatly smaller than a received light quantity on the glass back surface; therefore, a received light waveform of the glass front surface cannot be acquired. In such cases, in FIG. 6D, since a received light waveform of the glass front surface, which is a measurement aim, can be acquired, a measurement aim region is taken as all the area and a measurement aim surface is set as a first light receiving position. Contrast thereto, in FIG. 6E, a received light waveform of the glass front surface, which is a measurement aim, cannot be acquired. In this case, a laser light emitting quantity and a light receiving gain are adjusted till a received light waveform of the glass front surface can be acquired. If a received light waveform of the glass front surface have been able to be acquired, a measurement region is set with a center between two measurement aim surfaces as a boundary. In this case, since the glass front surface is a measurement aim, a region including a first light receiving position (glass front surface) is set to a measurement aim region with a center between two measurement aim surfaces as a boundary.

After measurement aim regions are set as described above, desired measurement of displacement is conducted by means of a known method based on received light images in the measurement aim regions. At this time, since in each of measurement aim regions, a laser light emitting quantity of a light projecting element is adjusted so as to be optimal in measurement regardless of a magnitude of a reflectance of a measurement aim surface, high precision measurement can be performed. Even in a case where a difference in reflectance between front and back surfaces of a glass is very large as shown in FIGS. 6D and E, and therefore, one reflecting surface cannot be acquired, a measurement aim surface is automatically detected, a desired measurement can be performed.

FIGS. 7A to 7E show setting of measurement regions in a case where a glass back surface is measured. Therefore, in the figure showing a state after setting of a measurement aim region on the right side, a received light waveform on the right side (glass back surface) is set as a measurement aim.

Figure 7A:
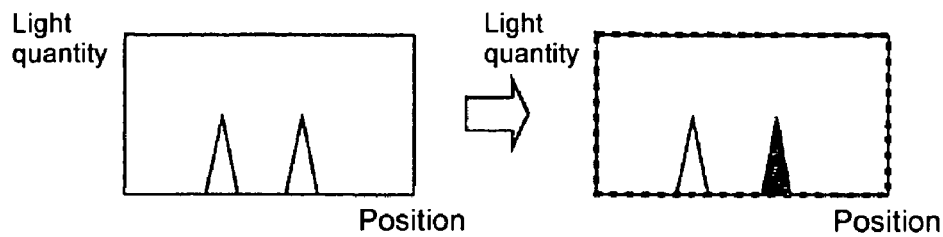
FIGS. 7A to 7E show diagrams describing setting of measurement regions in a case where a glass back surface is measured.

In FIG. 7A, there is a case where a difference in light quantity between two acquired reflecting surfaces is small. In such a way, in a case where a difference in light quantity therebetween is small, a region covers all the area and the measurement aim region is set to a second light receiving position (glass back surface). In such a way, no necessity arises for dividing a region into to two sub-regions in a case where a difference in light quantity between two reflecting surfaces is small, in a similar way to that in a case where a glass front surface is adopted as a measurement aim.

Figure 7B:
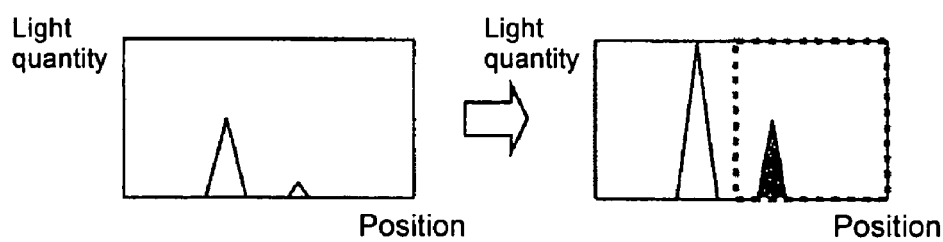
Figure 7C:
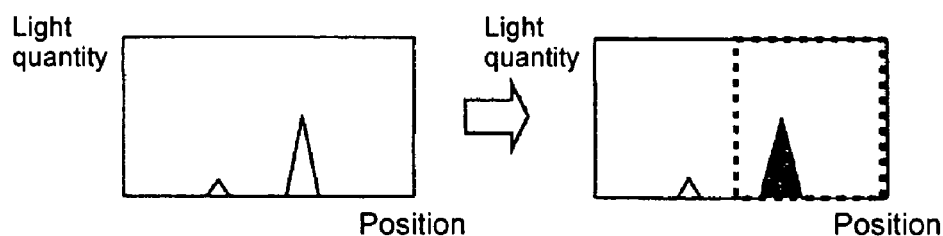

In FIGS. 7B and 7C, there are shown cases where a difference in light quantity between two reflecting surfaces is not neglected. FIG. 7B shows a case where a received light quantity at a first light receiving position (glass front surface) is larger than a received light quantity at a second light receiving position (glass back surface), while FIG. 6C shows a case where a received light quantity on the glass back surface is larger than that of the glass front surface. In a case where a difference in received light quantity occurs in this way, a region is set with a center between first and second measurement aim surfaces as a boundary. Since a measurement aim is in this case a glass back surface, a region including a second light receiving position is, as shown in FIGS. 7B and 7C, designated as a measurement aim region with a center between first and second measurement aim surfaces as a boundary.

Figure 7D:
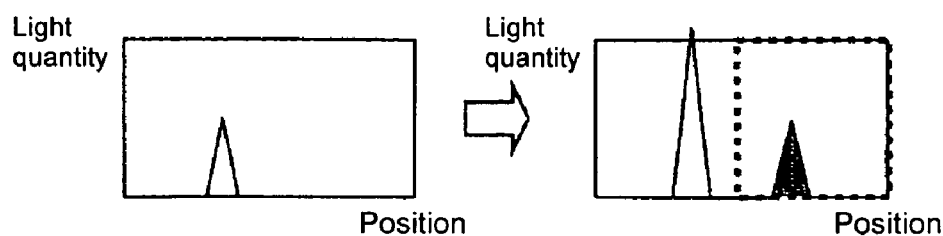
Figure 7E:
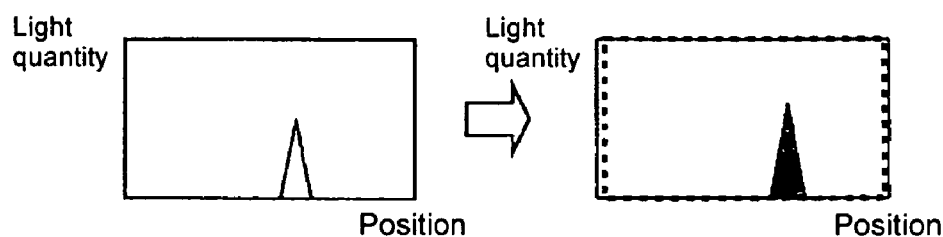

In FIGS. 7D and 7E, there are shown cases where a difference in light quantity between two surfaces is very large, and in FIG. 7D, there is shown a case where, though a received light waveform on a glass front surface is acquired, a received light quantity on a glass back surface is greatly smaller than that on a glass front surface; therefore, a received light waveform of the glass back surface is not acquired. Contrast thereto, in FIG. 7E, there is shown a case where, though a received light waveform of a glass back surface is acquired, a received light quantity on a glass front surface is greatly smaller than a received light quantity on the glass back surface; therefore, a received light waveform of the glass front surface cannot be acquired. In such cases, in FIG. 7D, a received light waveform of the glass back surface, which is a measurement aim, cannot be acquired. In this case, a laser light emitting quantity and a light receiving gain are adjusted till a received light waveform of the glass back surface (a second light receiving position) is acquired. If a received light waveform of the glass back surface can be acquired, a region is set with a center between two measurement aim surfaces as a boundary. In this case, since the glass back surface is a measurement aim, a region including a second light receiving position (glass back surface) is set to a measurement aim region with a center between two measurement aim surfaces as a boundary. Contrast thereto, since in FIG. 7E, a received light waveform of the glass back surface, which is a measurement aim, can be acquired, a measurement aim region covers all the area and a measurement aim surface is set as a first light receiving position.

After measurement aim regions are set as described above, desired measurement of displacement is conducted by means of a known method based on received light images in the measurement aim regions. At this time, since in each of measurement aim regions, a laser light emitting quantity of a light projecting element is adjusted so as to be optimal in measurement regardless of a magnitude of a reflectance of a measurement aim surface, high precision measurement can be performed. Even in a case where a difference in reflectance between front and back surfaces of a glass is very large and therefore, one reflecting surface cannot be acquired as shown in FIGS. 7D and 7E, a measurement aim surface is automatically detected, a desired measurement can be performed.

In FIGS. 8A to 8D, there are shown setting of measurement regions in a case where two regions are measured in which an automatic region setting processing according to the invention is employed.

Figure 8A:
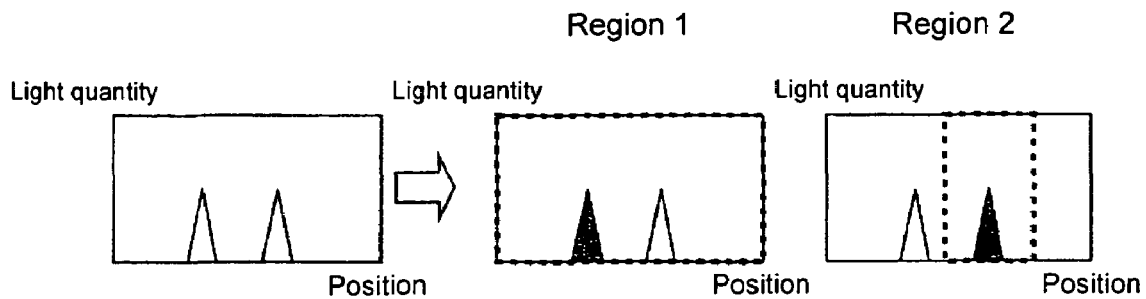
FIGS. 8A to 8D shows diagrams describing setting of measurement regions in a case where two regions are measured.

In FIG. 8A, there is a case where a difference in light quantity between two acquired reflecting surfaces is small. In such a case, the measurement aim is divided into a region 1 a measurement aim of which is designated as a first light receiving position, wherein a measurement region covers all the area, and a region 2 a measurement aim of which is designated as a second light receiving position, wherein a measurement region covers a range up to the center between reflection surfaces with a second light receiving position as a center.

Figure 8B:
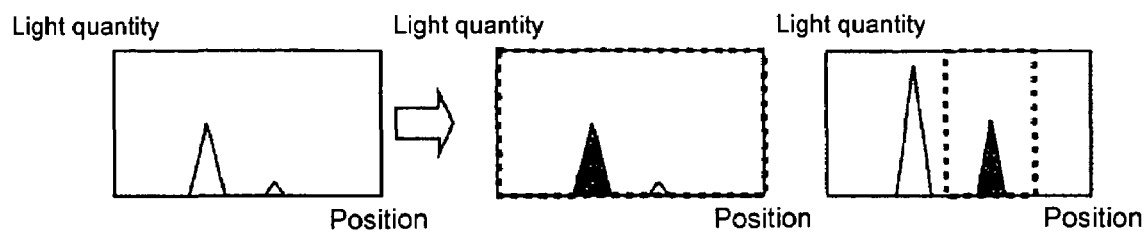
Figure 8C:
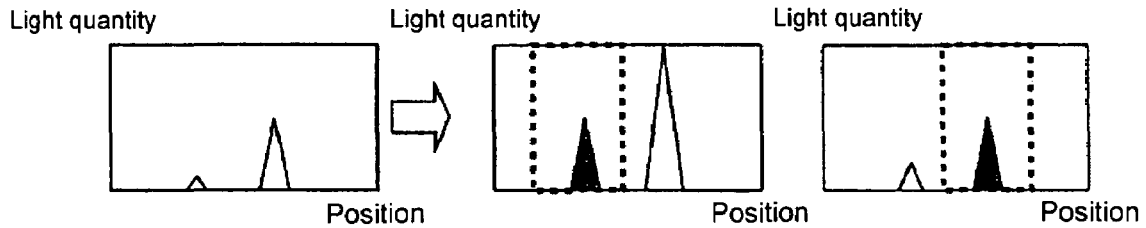

In FIGS. 8B ad 8C, there are shown cases where a difference in receiving light quantity occurs between two reflecting surfaces. FIG. 8B shows a case where a received light quantity at a first light receiving position (glass front surface) is larger than a received light quantity at a second light receiving position (glass back surface), while FIG. 8C shows a case where a received light quantity of a glass back surface is larger than a received light quantity at a glass front surface. In this way, a case where a difference in received light quantity occurs, selection of a region is varied according to a position of a surface on which a receiving light quantity is large. That is, in a case where a received light quantity at a first light receiving position is larger as shown in FIG. 8B, the measurement aim is divided into a region 1 a measurement aim of which is designated as a first light receiving position, wherein a measurement region covers all the area, and a region 2 a measurement aim of which is designated as a second light receiving position, wherein a measurement aim region covers a range up to the center between reflection surfaces with a second light receiving position as a center. Contrast thereto, in a case where a received light quantity at a second light receiving position is larger, a measurement aim is divided into a region 1 a measurement aim of which is designated as a first light receiving position, wherein a measurement aim region covers a range up to the center between reflection surfaces with a first light receiving position as a center and a region 2 a measurement aim of which is designated as a second light receiving position, wherein a measurement aim region covers a range up to the center between reflection surfaces with a second light receiving position as a center.

Figure 8D:
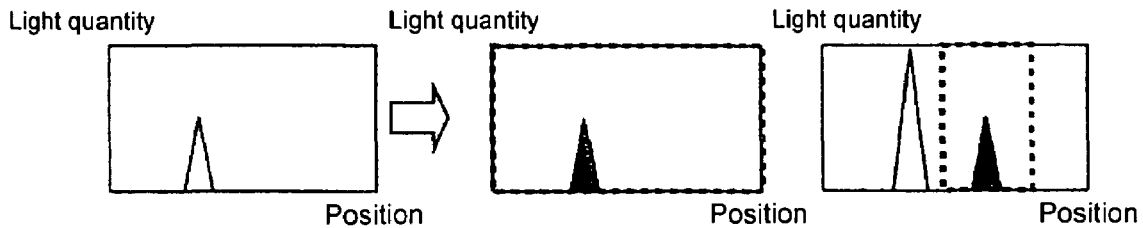

In FIG. 8D, there is shown a case where a difference in light quantity between first and second light receiving positions is very large. In this example, a situation is such that since, though a received light image can be acquired at a first light receiving position (glass front surface), a received light quantity at a second light receiving position is greatly smaller than a received light quantity at a first light receiving position, a received image cannot be acquired. In such a case, a region on which a smaller received light quantity is set as a region 2. That is, measurement is performed dividing a measurement aim into a region 1 a measurement aim of which is designated as a position at which a received light image can be acquired (a first light receiving position), wherein a measurement aim region covers all the area, and a region 2 a measurement aim of which is designated as a second light receiving position, wherein a measurement aim region covers a range up to the center between reflecting surfaces with the second light receiving position as a center.

After measurement aim regions are set as described above, desired measurement of displacement is conducted by means of a known method based on received light images in the measurement aim regions. It is naturally possible to set a region including a light receiving position of a surface and having a predetermined positional relation with the light receiving position as a measurement aim region. At this time, since in each of measurement aim regions, a laser light emitting quantity of a light projecting element is adjusted so as to be optimal in measurement regardless of a magnitude of a reflectance of a measurement aim surface, high precision measurement can be performed. Even in a case where a difference in reflectance between front and back surfaces of a glass is very large as shown in FIG. 8D, and therefore, one reflecting surface cannot be acquired, a measurement aim surface can be automatically detected and a desired measurement can be performed.

Figure 9:
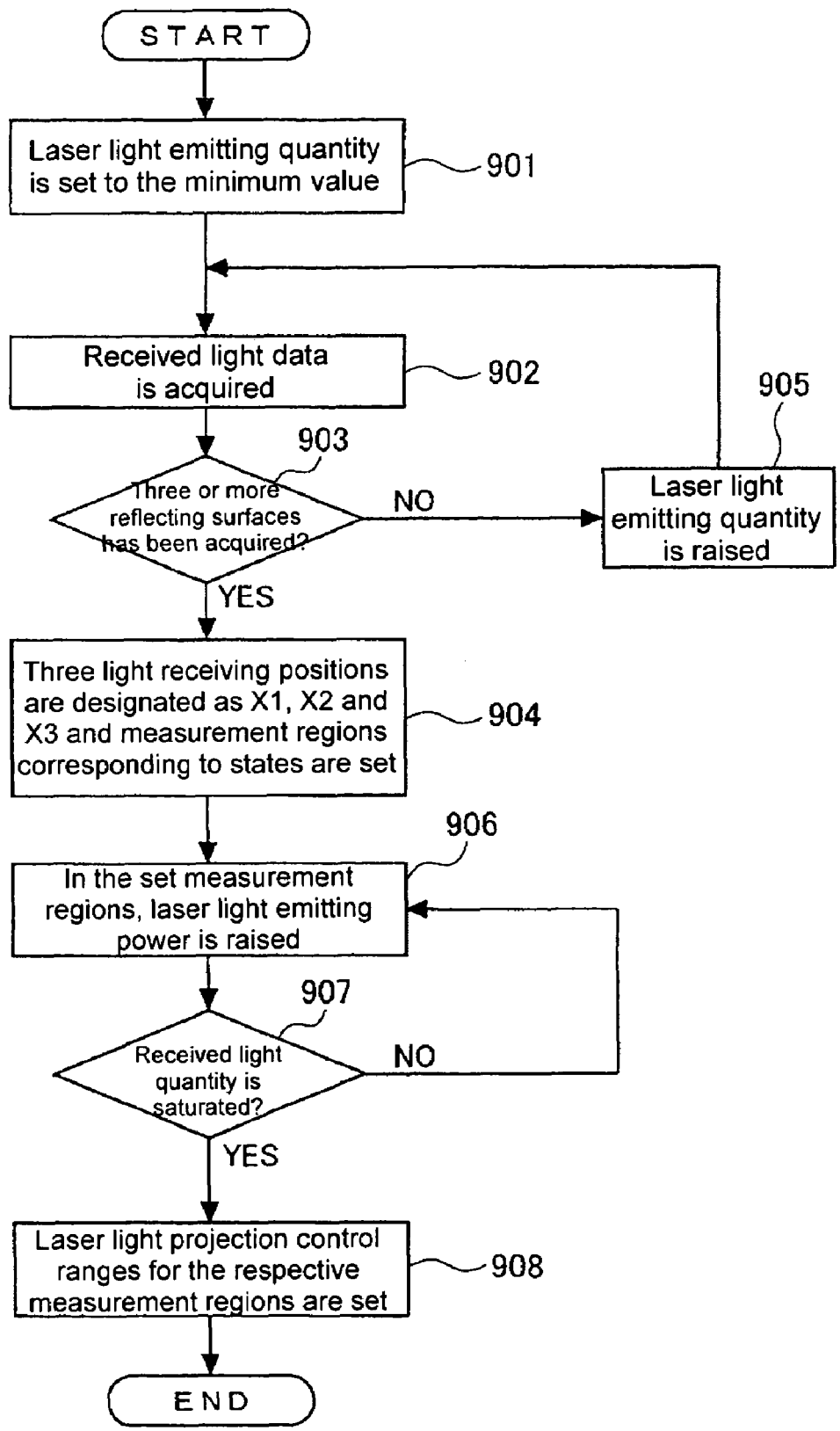
FIG. 9 shows a flowchart of a measurement region setting processing in a case where a measurement region is a glass gap.

An automatic setting processing for a measurement region according to the invention is also effective in a case where a work on the other side of a glass is measured. With reference to FIGS. 9 and 10, description will be given of an automatic setting processing for a measurement region in a case where a spacing between the glass and a surface of the work on the other side of the glass (glass gap) is measured.

In FIG. 9, there is shown a flowchart of the automatic setting processing for a measurement region, wherein a measurement aim is a glass gap. As shown in the figure, first of all, initialization in which setting a laser light emitting quantity to the minimum value is performed (step 901). Then, received light data is acquired at the set laser light emitting quantity (step 902) and it is determined whether or not three or more reflecting surfaces has been acquired (step 903). If three or more reflecting surfaces have not been acquired (step 903, NO), a laser light emitting quantity is raised (step 905) and acquirement of received light data is repeated. If three or more reflecting surfaces have been acquired (step 903, YES), the three light receiving positions are designated as X1, X2 and X3 and measurement regions corresponding to states are set (step 904). Subsequent thereto, in the set measurement regions, laser light emitting power is raised (step 906) and the operation is continued till a received light quantity in each measurement region is saturated (step 907, NO). If saturation of a received light quantity is confirmed in each of the measurement regions (step 907, YES), laser light projection control ranges for the respective measurement regions are set (step 908).

Increase in laser light emitting quantity in the process is, in a similar way as to that when a glass thickness is measured, implemented by a equal magnification (for example, ×1.1) at a time. By increasing a laser light emitting quantity gradually in this way, noise from external disturbance light or multiple reflection can be discriminated from reflection on an actual measurement surface with ease, thereby enabling reduction in measurement precision to be caused by such noise to be prevented.

Note that in the example, a reflection surface, which is a necessary measurement aim surface, is acquired by adjusting a laser light emitting quantity, while a similar effect can be obtained by adjusting a light receiving sensitivity (gain) on the laser receiving side. Adjustment may be simultaneously applied to a laser light emitting quantity on the light projecting element side and a light receiving sensitivity on the light receiving element side.

In FIG. 10, there is shown a region teaching function associated with automatic setting of a measurement region corresponding to a measurement surface, which is a measurement aim. In FIG. 10A, there is shown a state prior to setting of a measurement region in a case where three reflecting surfaces have been acquired (glass front surface, glass back surface and a work surface on the other side of the glass). In FIG. 10B, there is shown setting of a measurement region in a case where a first light receiving position (glass surface) is a measurement aim, in FIG. 10C, there is shown setting of a measurement region in a case where a second light receiving position (glass back surface) is a measurement aim and in FIG. 10D, there is shown setting of a measurement region in a case where a third light receiving position (work surface on the other side of the glass) is a measurement aim. Boundaries of a measurement region are set, as shown in the figures, before and after the measurement surface so as to include a measurement aim surface.

Figure 10A:
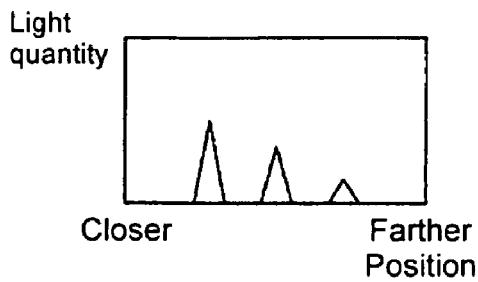
FIGS. 10A to 10G shows diagrams describing setting of a measurement region in a case where three reflecting surfaces are acquired.
Figure 10B:
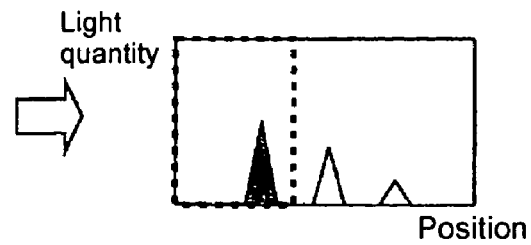
Figure 10C:
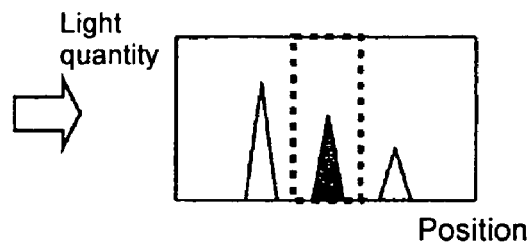
Figure 10D:
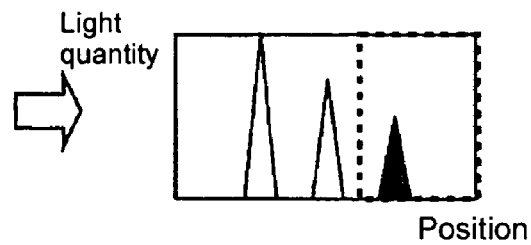

To be more detailed, in a case where a first light receiving position (glass front surface) is a measurement aim as shown in FIG. 10B, a measurement region is set so as to include a first light receiving position and cover before and after the position. In FIG. 10C, similarly, a measurement region is set so as to include a second light receiving position (glass back surface), which is a measurement aim, and cover before and after the position and in FIG. 10D as well, a measurement region is set so as to include a third light receiving position (work surface on the other side of the glass), which is a measurement aim, and cover before and after the measurement aim. In such a way, for each measurement surface, which is a measurement aim, a region including the measurement surface and cover before and after the measurement aim is set as a measurement region and a stable measurement is realized using a laser light emitting quantity suitable for the measurement region.

Figure 10E:
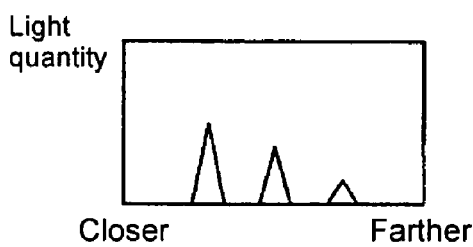
Figure 10F:
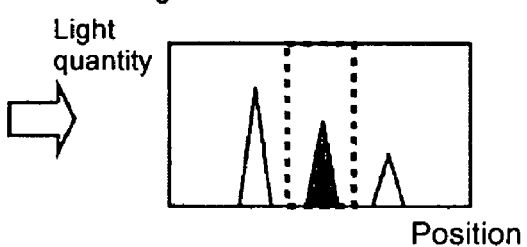
Figure 10G:
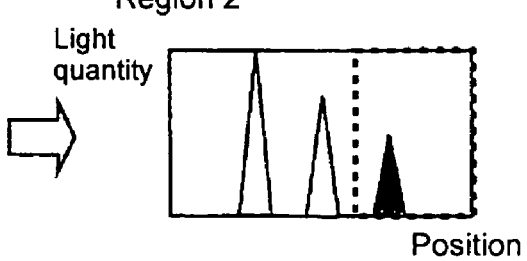

In FIGS. 10E to 10G, there are shown setting of measurement regions in a case where a glass gap is measured adopting two region measurement using an automatic region setting processing of the invention. FIG. 10E, in a similar way to that in FIG. 10A, shows a state prior to setting of a measurement region in a case where three reflecting surfaces have been acquired. In a case where a gap is, in this way, measured in two region measurement, measurement regions are set so that a region 1 includes a second light receiving position (FIG. 10F) and a region 2 includes a third light receiving position (FIG. 10G).

By setting a measurement aim region as described above, a desired measurement of displacement is performed according to a well known method based on received images in the measurement aim regions. At this time, since a laser light emitting quantity of a light projecting element is adjusted in each measuring aim region so as to be most suitable for measurement regardless of a magnitude of a reflectance of a measurement aim surface, it enables high precision measurement to be performed. By setting a measurement region as shown in FIGS. 10E to 10G, it is possible to correctly measure a second light receiving position (glass back surface) and a third light receiving position (work surface on the other side of the glass), which in turn makes it possible to perform stable measurement of a gap to be realized.

If a measurement aim is different as shown in FIGS. 5 to 10, it is necessary to set a measurement region adapted for a measurement aim. A user selects a measurement aim in advance, setting of a measurement region adapted for the measurement aim can be automatically performed. Measurement aims in this case include: a glass front surface, a glass back surface, a glass thickness, a work surface on the other side of the glass, a glass gap and others. By selecting an aim which a user desires to measure in advance, setting of a measurement region after the selection can be automatically performed without additional intervention by the user and detailed setting, which makes it possible to perform measurement of an aimed portion or site.

In a case where a user desires to measure a glass thickness as a measurement aim, a measurement region is automatically set (front and back surfaces) to thereby a two region measurement region setting processing is automatically performed without user's participation therein in the following setting. In a case where a user desires to measure a glass gap as a selected measurement aim, measurement regions (back surface and work surface on the other side) are automatically set and thereby, a two region measurement setting processing is automatically performed without user's participation therein in the following setting.

A laser light emitting quantity of a light projecting element is sequentially raised by an equal magnification at a time (in this case, ×1.1) from the minimum value and in a case where a measurement aim is measurement of a glass thickness, a laser light emitting quantity is raised till two reflecting surfaces can be acquired and in a case where a measurement aim is a glass gap, a laser light emitting quantity is raised till three reflecting surfaces can be acquired. Then, measurement aim surfaces of a region 1 and a region 2 are automatically set on respective acquired reflecting surfaces. In the processes, the side having a smaller received light quantity is designated as a measurement aim of the region 2. A start position or an end position of a measurement region is set between the regions 1 and 2. After the setting is completed, the upper limit of a laser control range is performed. The upper limit, as described above, is set to a value about 1.4 times as large as a laser light emitting quantity when a reflecting surface can acquire. By performing teaching associated with a region setting for a measurement aim region in this way, a measurement region can be automatically set, and an operational efficiency in measurement is drastically improved, which makes it possible to stably measure each measurement aim surface even in a case where a glass plate or the like having plural surfaces each greatly different in reflectance from the others because of setting a region for each reflecting surface, thereby, enabling a measurement precision to be kept high.

Note that in the embodiment, description has been given of a case where a predetermined number of surfaces is adopted, while a case is allowed where the number of reflecting surfaces are inputted, thereafter a laser light emitting quantity and/or a light receiving gain are stepwise altered to repeat a processing for detecting a reflection surface till an inputted number of reflecting surfaces is acquired, and after the inputted number of surfaces has been obtained, setting of a measurement region is performed for each surface.

In such a way, by adjusting a laser light emitting quantity at any proper timing, acquiring a received light waveform on a measurement surface, which is a measurement aim, and automatically performing a setting processing for a measurement region based on the measurement aim, a processing on the user side is only designation of a measurement aim and setting of a measurement region and an actual measurement following the designation can be automatically performed. In this way, by automatically performing setting of a measurement region, which is otherwise very complicated, an operational efficiency in measurement is greatly improved and even in a measurement on a glass or the like having plural refractive indexes each different from the others, a stable measurement can be ensured.

What is claimed is:

1. A displacement sensor comprising:
   a light projecting element for illuminating a measurement aim object at a predetermined angle with light;
   a light receiving element for receiving a reflected light from the measurement aim object illuminated with light;
   an automatic measurement aim region setting device for automatically increasing an amount of an emitting light of the light projecting element by a predetermined quantity or a predetermined ratio until two or more reflecting surfaces of the measurement aim object are acquired on the light receiving element, and automatically setting measurement aim regions for respective at least two reflecting surfaces acquired; and
   a displacement measuring device performing desired measurement of displacement based on a received light image on the light receiving element corresponding to the set measurement aim regions.

2. The displacement sensor according to claim 1, wherein the automatic measurement aim region setting device continuously increases the amount of an emitting light of the light projecting element until three or more reflecting surfaces of a measurement aim object on the light receiving element are acquired.

3. The displacement sensor according to claim 1, wherein the automatic measurement aim region setting device acquires a reflecting surface based on a maximum value of a receiving light quantity distribution on the received light image and sets the measurement aim regions on respective reflecting surfaces so as not to overlap on waveforms of receiving light quantity distributions corresponding to other reflecting surfaces.

4. The displacement sensor according to claim 1, wherein the light receiving element is a two-dimensional image pick-up element.

5. The displacement sensor according to claim 1, wherein the light receiving element is a one-dimensional image pick-up element.

6. A displacement sensor comprising:
   a light projecting element for illuminating a measurement aim object at a predetermined angle with light;
   a light receiving element for receiving a reflected light from the measurement aim object illuminated with light;
   an automatic measurement aim region setting device for automatically increasing a light receiving gain of the light receiving element by a predetermined quantity or a predetermined ratio until two or more reflecting surfaces of a measuring aim object are acquired on the light receiving element, and automatically setting measurement regions for respective at least two reflecting surfaces acquired; and
   a displacement measuring device performing desired measurement of displacement based on a received light image of the receiving light element corresponding to the set measurement aim regions.

7. The displacement sensor according to claim 6, wherein the automatic measurement aim region setting device continuously increases the light receiving gain of the light receiving element until three or more reflecting surfaces of a measurement aim object on the light receiving element are acquired.

8. The displacement sensor according to claim 6, wherein the automatic measurement aim region setting device acquires a reflecting surface based on a maximum value of a receiving light quantity distribution on the received light image and sets the measurement aim regions on respective reflecting surfaces so as not to overlap on waveforms of receiving light quantity distributions corresponding to other reflecting surfaces.

9. The displacement sensor according to claim 6, wherein the light receiving element is a two-dimensional image pick-up element.

10. The displacement sensor according to claim 6, wherein the light receiving element is a one-dimensional image pick-up element.

11. A displacement sensor comprising:
    a light projecting element for illuminating a measurement aim object at a predetermined angle with light;
    a light receiving element for receiving a reflected light from the measurement aim object illuminated with light;
    an automatic measurement aim region setting device for automatically increasing a light emitting quantity of the light projecting element and a light receiving gain of the light receiving element, both simultaneously, by a predetermined quantity or a predetermined ratio until two or more reflecting surfaces of the measurement aim object are acquired on the light receiving element, and automatically setting measurement aim regions for respective at least two reflecting surfaces acquired; and
    a displacement measuring device performing desired measurement of displacement based on a received light image on the receiving light element corresponding to the set measurement aim regions.

* * * * *